(12) United States Patent
Shenoy et al.

(10) Patent No.: US 12,717,390 B2
(45) Date of Patent: Aug. 25, 2026

(54) PROCESSOR SKIN TEMPERATURE POWER MANAGEMENT BASED ON MULTIPLE EXTERNAL SENSORS

(71) Applicants: ADVANCED MICRO DEVICES, INC., Santa Clara, CA (US); ATI TECHNOLOGIES ULC, Markham (CA)

(72) Inventors: Sukesh Shenoy, Austin, TX (US); Adam N. C. Clark, Markham (CA); Christopher M. Jaggers, Austin, TX (US)

(73) Assignees: Advanced Micro Devices, Inc., Santa Clara, CA (US); ATI TECHNOLOGIES ULC, Markham (CA)

( * ) Notice: Subject to any disclaimer, the term of this patent is extended or adjusted under 35 U.S.C. 154(b) by 467 days.

(21) Appl. No.: 16/717,272

(22) Filed: Dec. 17, 2019

(65) Prior Publication Data

US 2021/0181820 A1 Jun. 17, 2021

(51) Int. Cl.
*G06F 1/20* (2006.01)
*G01K 13/00* (2021.01)
(Continued)

(52) U.S. Cl.
CPC ............. *G06F 1/206* (2013.01); *G01K 13/00* (2013.01); *G06F 1/3203* (2013.01); *G06F 1/3206* (2013.01); *G06F 1/3287* (2013.01)

(58) Field of Classification Search
CPC ...... G06F 1/206; G06F 1/3203; G06F 1/3206; G06F 1/3287; G06K 13/00
See application file for complete search history.

(56) References Cited

U.S. PATENT DOCUMENTS 9,958,921 B2 5/2018 Jain et al.
10,114,446 B1 10/2018 Law et al.
(Continued)

FOREIGN PATENT DOCUMENTS

CN 107430037 A 12/2017
JP 2018081467 5/2018
JP 2019095948 6/2019

OTHER PUBLICATIONS

International Search Report and Written Opinion mailed Apr. 12, 2021 for PCT/US2020/065011, 10 pages.
(Continued)

*Primary Examiner* — Paul Yen

(57) ABSTRACT

A processing unit manages temperature by correlating readings from a plurality of external temperature sensors to a skin temperature of the processing unit, wherein the correlation is based on characteristics of a computer chassis that is to include the processing unit. The processing unit is mounted on a printed circuit board (PCB) or other substrate that is to be placed in a computer chassis. Each of a plurality of temperature sensors is placed at a different location of the PCB to provide temperature readings from a variety of locations of the PCB. A temperature controller of the processing unit receives temperature readings from the plurality of sensors and correlates the temperature readings with a skin temperature of the processing unit based on a plurality of correlation values.

19 Claims, 3 Drawing Sheets

(51) Int. Cl.

| | |
|---|---|
| ***G06F 1/3203*** | (2019.01) |
| ***G06F 1/3206*** | (2019.01) |
| ***G06F 1/3287*** | (2019.01) |

(56) References Cited

U.S. PATENT DOCUMENTS

| | | | | |
|---|---|---|---|---|
| 10,488,873 | B2 | 11/2019 | Delano et al. | |
| 10,503,222 | B2 | 12/2019 | Mittal et al. | |
| 2014/0245032 | A1* | 8/2014 | Vadakkanmaruveedu .................. | G06F 1/203 713/300 |
| 2015/0075186 | A1* | 3/2015 | Prajapati ................. | F25B 21/02 62/3.7 |
| 2016/0048181 | A1* | 2/2016 | Rosenzweig .......... | G01K 1/026 713/322 |
| 2016/0266628 | A1* | 9/2016 | Jain ........................ | G01K 1/143 |
| 2016/0313190 | A1* | 10/2016 | Miyajima ................ | F24F 11/30 |
| 2016/0378168 | A1 | 12/2016 | Branover et al. | |
| 2017/0038806 | A1 | 2/2017 | Prajapati et al. | |
| 2017/0212537 | A1* | 7/2017 | Delano .................. | G05D 23/19 |
| 2017/0351308 | A1 | 12/2017 | Rangarajan et al. | |
| 2019/0064892 | A1 | 2/2019 | Kim et al. | |
| 2019/0155347 | A1 | 5/2019 | Ishii et al. | |
| 2022/0164021 | A1* | 5/2022 | Egan ....................... | G06F 1/206 |

OTHER PUBLICATIONS

Extended European Search Report mailed Dec. 11, 2023 for 20903045.1, 7 pages.

Indian Office Action mailed Nov. 29, 2024 for Indian Application No. 202217030022, 5 pages.

Office Action issued in Japanese Application No. 2022-535497, mailed Oct. 15, 2024, 4 pages.

Translation of Korean Office Action mailed May 2, 2025 for App. No. 10-2022-7020737, 8 pages.

Translation of Chinese Office Action mailed May 16, 2025 for App. No. 202080089643.1, 10 pages.

Korean Office Action mailed Jan. 20, 2026 for Korean Application No. 10-2022-7020737, 16 pages.

Chinese Notice of Allowance mailed Jan. 12, 2026 for Chinese Application No. 202080089643.1, 8 pages.

International Preliminary Report on Patentability, mailed Mailed Jun. 30, 2022 for PCT Application No. PCT/US2020/065011, 7 pages.

* cited by examiner

PROCESSOR SKIN TEMPERATURE POWER MANAGEMENT BASED ON MULTIPLE EXTERNAL SENSORS

BACKGROUND

To improve efficiency and reduce power consumption, computing devices sometimes employ a processor, referred to as an accelerated processing unit (APU), that includes multiple heterogeneous processor cores. For example, some APUs include one or more central processing unit (CPU) cores and one or more graphics processing unit (GPU) cores. However, in operation the multiple processor cores of an APU tend to generate a relatively large amount of heat, which can impact both the reliability and useful lifespan of the APU. Accordingly, a computer system that includes an APU often employs a temperature management system, that employs components such as heat pipes that move heat away from the APU towards corresponding heatsinks to dissipate the thermal energy. However, conventional temperature management systems are relatively inflexible, with varying effectiveness in different computing environments.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
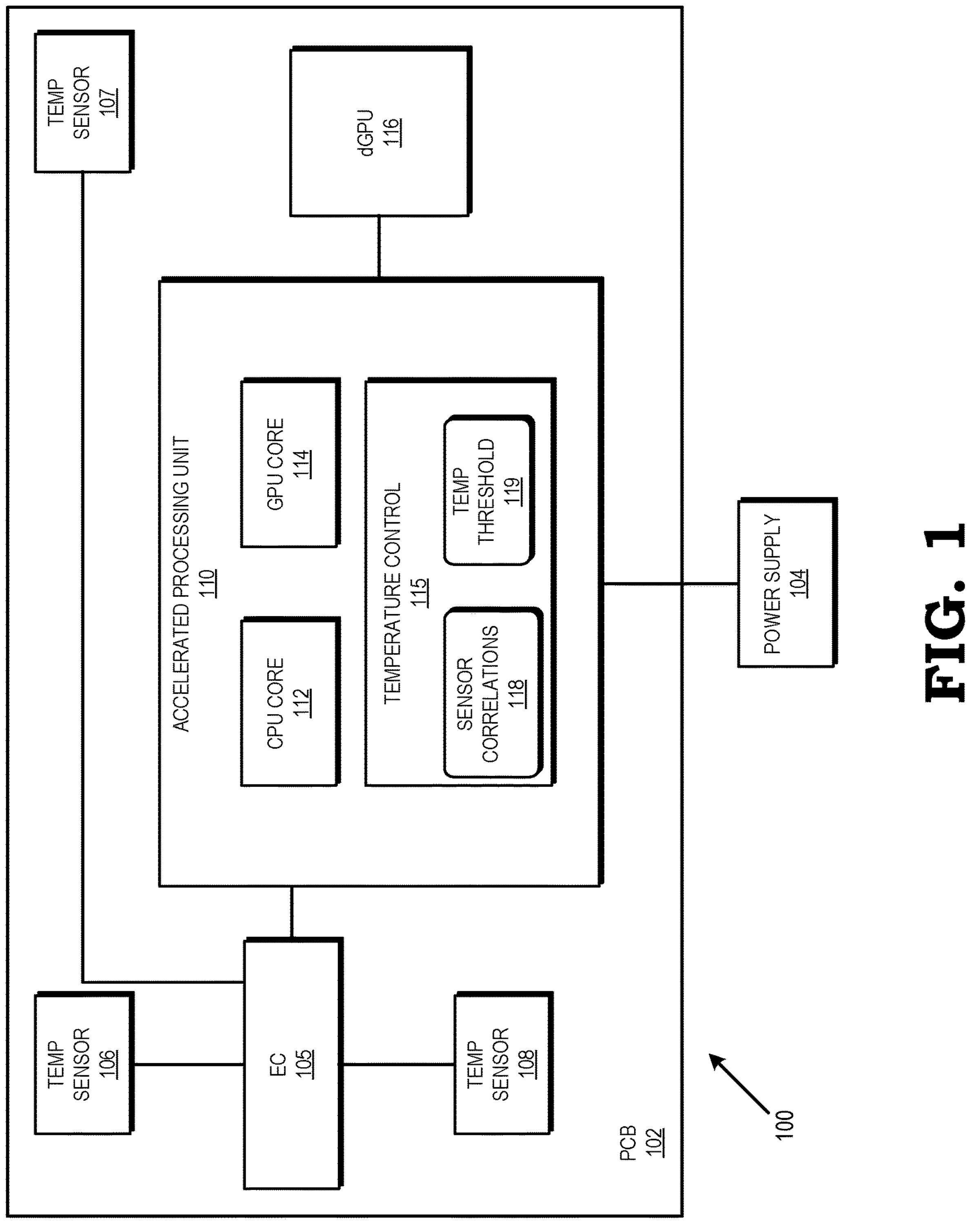
FIG. 1 is a block diagram of a processing system having a temperature management system that correlates temperature readings from multiple temperature sensors to manage the temperature of an accelerated processing unit (APU) in accordance with some embodiments.

FIGS. 1-4 illustrate techniques for managing the temperature of one or more processing units, such as an accelerated processing unit (APU) or other heterogenous processing unit, by correlating readings from a plurality of external temperature sensors (that is, external to the processing unit) to a skin temperature of the processing unit, wherein the correlation is based on characteristics of a computer chassis that is to include the processing unit. For example, in some embodiments the processing unit is mounted on a printed circuit board (PCB) or other substrate that is to be placed in a computer chassis (e.g., a laptop chassis). Each of a plurality of temperature sensors is placed at a different location of the PCB to provide temperature readings from a variety of locations of the PCB. A temperature controller of the processing unit receives temperature readings from the plurality of sensors and correlates the temperature readings with an estimated or otherwise predicted skin temperature of the processing unit based on a plurality of correlation values that represent measured or predicted correspondences between the temperature at the sensors and the processing unit's skin temperature, wherein the correlation values are based on characteristics of the computer chassis. In response to the temperature measurements indicating that the skin temperature likely exceeds a specified thermal threshold, the temperature controller takes remedial action, such as reducing an amount of power supplied to the processing unit.

Managing processing unit temperature based on correlating temperature readings from multiple external sensors as described herein supports more flexible and more accurate temperature management. In particular, increases in temperature at different locations of a computing system cause a corresponding increase in the skin temperature of the processing unit, but in many cases such increases are difficult or expensive to detect using a temperature sensor mounted on the skin of the processing unit itself. Further, a computer system can incur relatively large differences in temperature at different locations of the system, such that an individual temperature sensor provides an inaccurate indication of the processing unit's skin temperature. Thus, by employing multiple temperature sensors at different locations of the computer system, and by correlating the measurements from the different temperature sensors with a predicted skin temperature of the processing unit, the computer system is able to effectively manage processing unit temperature under a wide variety of conditions and system configurations.

In some embodiments, the correlation values used by the processing unit are based on virtual chassis values that reflect a predicted impact of the computer chassis on the correlations between the readings of the temperature sensors and the skin temperature of the processing unit. To illustrate, in many cases the PCB and processing unit are intended to be placed in a computer chassis, such as a laptop chassis, to protect the PCB and associated components, to connect the processing unit to other components of a processing system, and the like. The computer chassis impacts such factors as air currents, heat dissipation patterns, and the like, that in turn affect the correlation between the temperature reading of a given temperature sensor of the PCB and the skin temperature of the processing unit. By incorporating these effects in the correlation values, the processing unit improves the accuracy of the skin temperature measurement, thereby improving the effectiveness of temperature management.

In some embodiments, the predicted impact of the computer chassis is identified based on testing of the PCB, and the temperature sensors, while the PCB is placed in the chassis (or a similar chassis) itself. However, in some cases the cost of performing such testing is prohibitive. Accordingly, in some embodiments the correlation values are set based on a virtual model of the chassis that predicts the impact of the computer chassis on the correlations. The accuracy of the correlation values is thereby improved while reducing the expense of developing the correlation values.

Turning to FIG. 1, a block diagram of a processing system 100 that implements temperature control based on measurements from a plurality of temperature sensors is depicted in accordance with some embodiments. The processing system 100 includes a plurality of components that together support the execution of computer instructions. Accordingly, in different embodiments the processing system 100 is embedded in an electronic device, such as a desktop computer, laptop computer, server, game console, smartphone, tablet, automobile or other vehicle, and the like, and executes sets of instructions (e.g., computer programs) to carry out tasks on behalf of the electronic device.

To execute instructions, the processing system 100 includes an APU 110 having multiple processor cores, wherein each processor core carries out instructions or operations assigned to the processor core. In some cases, the instructions are general-purpose instructions to execute general-purpose tasks, such as execution of an operating system, interfacing with one or more input/output devices (not shown), and the like. In other cases, the operations are special-purpose operations, such as graphics operations (e.g. operations to carry out the drawing of objects for a display), vector processing operations, machine learning or artificial intelligence operations, and the like. To efficiently execute the different types of instructions and operations, the APU 110 includes different types of processor cores. For example, in the embodiment of FIG. 1 the APU 110 includes a central processing unit (CPU) core 112 to execute general purpose instructions and an integrated graphics processing unit (iGPU) core 114 to execute graphics operations. In other embodiments, the APU 110 includes additional CPU cores, additional GPU cores, or any combination thereof. Instead of, or in addition to, one or more CPU cores or one or more GPU cores, in some embodiments the APU 110 includes other types of processor cores not shown at FIG. 1, such as one or more vector processing cores, digital signal processing (DSP) cores, artificial intelligence (AI) cores, inference engine cores, and the like, each to execute a corresponding type or types of operations. As such, reference to the CPU core 112 or the iGPU core 114 applies similarly to other types of processor cores unless explicitly noted otherwise.

To further support execution of instructions, the processing system 100 includes a discrete coprocessor, such as a discrete GPU (dGPU) 116 that includes circuitry to execute graphics and vector processing operations based on commands received from the APU 110, at least under some operating modes of the processing system 100. For example, in some embodiments the processing system 100 is able to be placed in different modes depending on one or more factors such as the source of power supplied to the processing system 100 (e.g., battery power vs. electrical grid power), a type of program executing at the processing system 100, quality settings programmed by a user of the processing system 100, and the like. For example, in some embodiments the processing system 100 employs the iGPU core 114 for graphics operations when the processing system 100 is supplied power by a battery source and employs the dGPU 116 for graphics operations when the processing system 100 is supplied power by an electrical power grid.

In the depicted embodiment, the APU 110 is supplied power by a power supply 104. In some embodiments, the power supply 109 draws power from a wired power supply (that is, a power supply that provides power based on electricity supplied by an electrical power grid), a battery, or a combination thereof. In some embodiments, the power supply 109 provides a controllable amount of power to the APU 110. That is, the amount of power supplied by the power supply 109 is controllable based on control signaling provided to the supply. As described further below, adjustment of the power supply 109 assists in controlling the temperature of the APU 110 and the dGPU 116, thereby protecting the units' reliability and useful lifespan.

The APU 110 and dGPU 116 are mounted on a printed circuit board (PCB) 102. In some embodiments, the PCB 102 is a computer motherboard or similar PCB, upon which is mounted additional components of the processing system 100 not specifically illustrated at FIG. 1, including one or more memory modules, network interface modules, and the like. The PCB 102 further includes connectors, buses, conductive traces, and the like, to connect the components of the processing system 100, including connecting the APU 110 to one or more of the other components.

To assist in management of the different components, the processing system 100 includes an electronic controller (EC) 105. The EC 105 is an integrated circuit controller device that manages aspects of the processing system 100, such as aspects of temperature measurement and control, as described further below. In some embodiments, the EC 105 performs other operations, such as implementing commands provided by Basic Input/Output System (BIOS) firmware executing at the APU 110. For example, in some embodiments, in response to a reset or other condition, the APU 110 automatically executes a stored set of BIOS firmware (not shown at FIG. 1). During execution, the BIOS firmware communicates commands to the EC 105 to initialize storage systems (e.g. a hard drive or flash memory drive), initialize a network interface, initialize communication with other processing systems, and the like. The EC 105 receives and interprets the commands and implements the commands by providing corresponding control signaling to the different components of the processing system 100. The EC 105 thus provides an interface between the components of the processing system 100 and the APU 110, allowing the APU 110 to be used in a wide variety of processing systems having different configurations and components.

As noted above, one aspect of the processing system 100 managed by the EC 105 is the skin temperatures of the APU 110 and the dGPU 116. To illustrate, during operation of the processing system 100, the different system components, including the APU 110 and dGPU 116, generate heat. If the generated heat at or near the APU 110 or the dGPU 116 becomes too high for too long a period of time, the reliability or lifespan of the APU 110 or the dGPU 116 is adversely impacted. Accordingly, the processing system 100 employs a temperature control subsystem to manage the temperature of both the APU 110 and the dGPU 116, and in particular to maintain a skin temperature of each processing unit below a corresponding threshold, above which the corresponding processing unit is likely to be damaged or otherwise negatively impacted. The temperature control subsystem includes the EC 105, a plurality of temperature sensors 106, 107, 108, and a temperature control module 115.

The temperature sensors 106-108 each is a device that generates an electrical signal having a magnitude or other characteristic that is proportional to a temperature at or near the device. Examples of such devices include thermocouple sensors, resistance temperature detectors (RTDs), thermistor temperature sensors, integrated circuit (IC) temperature sensors, and the like, or a combination thereof. The EC 105 receives the electrical signals from the temperature sensors 106-108 and generates a corresponding digital value for each temperature sensor based on the corresponding electrical signal. Thus, the EC 105 generates, for each of the temperature sensors 106-108, a digital value (referred to herein as a digital temperature value) representing the temperature at or near the corresponding sensor. In some embodiments, including the illustrated embodiment of FIG. 1, the temperature sensors 106-108 are placed at different locations of the PCB 102. Accordingly, the digital temperature values generated by the EC 105 represent temperatures at various locations of the processing system 100.

It will be appreciated that the thermal characteristics at one location of the processing system 100 are based on heat sources, convection effects, and the like that have a general impact on the processing system 100 as a whole. Accordingly, the thermal characteristics and temperature at one location of the processing system 100 are generally correlated with the thermal characteristics and temperature at another location of the processing system 100. The temperature control subsystem of the processing system 100 uses this property to determine a skin temperature of the APU 110 and a skin temperature for the dGPU 116. In particular, the APU 110 includes a temperature control module 115 that stores sensor correlations 118, wherein one subset of the sensor correlations 118 indicate the correlations between the skin temperature of the APU 110 and the temperatures at or near the temperature sensors 106-108, and another subset of the sensor correlations 118 indicate the correlations between the skin temperature of the dGPU 116 and the temperatures at or near the temperature sensors 106-108. The temperature control module 115 receives the digital temperature values from the EC 105 and applies the corresponding ones of the sensor correlations to the digital temperature values to generate a skin temperature value for each of the APU 110 and the dGPU 116. For example, in some embodiments the temperature control module 115 generates a skin temperature value according to the following formula:

$$SK_1 = m_1x_1 + m_2x_2 + \ldots m_nx_n + C$$

where $SK_1$ is a skin temperature value, $x_Y$ is a digital temperature value for sensor Y, $m_Y$ is a sensor correlation value for the digital temperature value $x_Y$, and C is a constant based on characteristics of the PCB 102.

To determine the skin temperature of the APU 110, the sensor correlation value applied to a given digital temperature value is a correlation coefficient that indicates the correlation between the skin temperature of the APU 110 and the temperature sensor that generated the corresponding digital value. For example, in some embodiments $m_1$ is the sensor correlation that indicates the correlation between the temperature at or near the temperature sensor 107 and the skin temperature of the APU 110, and $x_1$ is the digital temperature value indicating the temperature measured by the temperature sensor 107. It will be appreciated that in some embodiments the thermal characteristics of different locations of the processing system 100 vary because of, for example, variations in surround materials and components, variations in air flow and convection currents, and the like. Accordingly, the correlation between the temperature measured by the different temperature sensors and the skin temperature of the APU 110 varies, and therefore the values of the sensor correlations also vary. For example, in some embodiments the value of the sensor correlation $m_1$ is different than the value of the sensor correlation $m_2$. Further, it will be appreciated that in some embodiments the temperature control module 115 identifies a skin temperature for the dGPU 116 using the formula set forth above, but with a different set of correlation values (that is, different values of $m_1$, $m_2$, and so on) and different constant C than are used for the APU 110. Identification of the sensor correlations 118, the constants C, and other values employed by the temperature control module 115 is described further below.

In some embodiments, the $SK_1$ value is relatively noisy for individual skin temperature measurements for a given processing unit. Accordingly, in these embodiments the temperature control module 115 applies an alpha filter to filter out noise, according to the following formula:

$$SK_\alpha = SK_1\alpha + SK_{\alpha-1}(1-\alpha)$$

where $SK_\alpha$ is the filtered skin temperature value, $\alpha$ is an alpha filtered value identified during characterization as described further below, and $SK_{\alpha-1}$ is a previous filtered skin temperature value.

The temperature control subsystem of the processing system 100 employs the filtered skin temperature values to control the skin temperatures of the APU 110 and the dGPU 116. For example, in some embodiments the temperature control module 115 periodically compares each of the filtered skin temperature values, for each of the APU 110 and the dGPU 116, to a temperature threshold 119. In response to a filtered skin temperature exceeding the temperature threshold 119, the temperature control module 115 reduces the power supplied by the power supply 104 to the APU 110, thereby ensuring that the skin temperatures of the APU 110 and dGPU 116 remain within specified safe limits. For example, in some embodiments the temperature control module 115 reduces the power by a specified amount. In other embodiments the temperature control module reduces the power based on an amount that is proportional to the amount by which the filtered skin temperature exceeds the temperature threshold 119. In some embodiments, the temperature control module 115 employs different temperature thresholds for the APU 110 and the dGPU 116.

As noted above, in some embodiments the values of the sensor correlations 118 (e.g., the values of $m_1$, $m_2$, . . . $m_n$ for each processing unit), as well as the constant values C and the filter values a are determined during a characterization process for the processing system 100. For example, in some embodiments the PCB 102 (or a PCB of similar design and configuration) is placed in a testing environment with a temperature sensor placed on a surface of an integrated circuit incorporating the APU 110. During characterization, this temperature sensor provides an indication of skin temperature of the APU 110. Different test workloads are executed at the APU 110, and for each executing workload a set of temperature readings is taken from each of the temperature sensors 106-108. These temperature readings are correlated with measurements of the skin temperature of the APU 110 to determine a set of sensor correlations. A similar process is employed to determine a set of sensor correlations for the dGPU 116.

Figure 2:
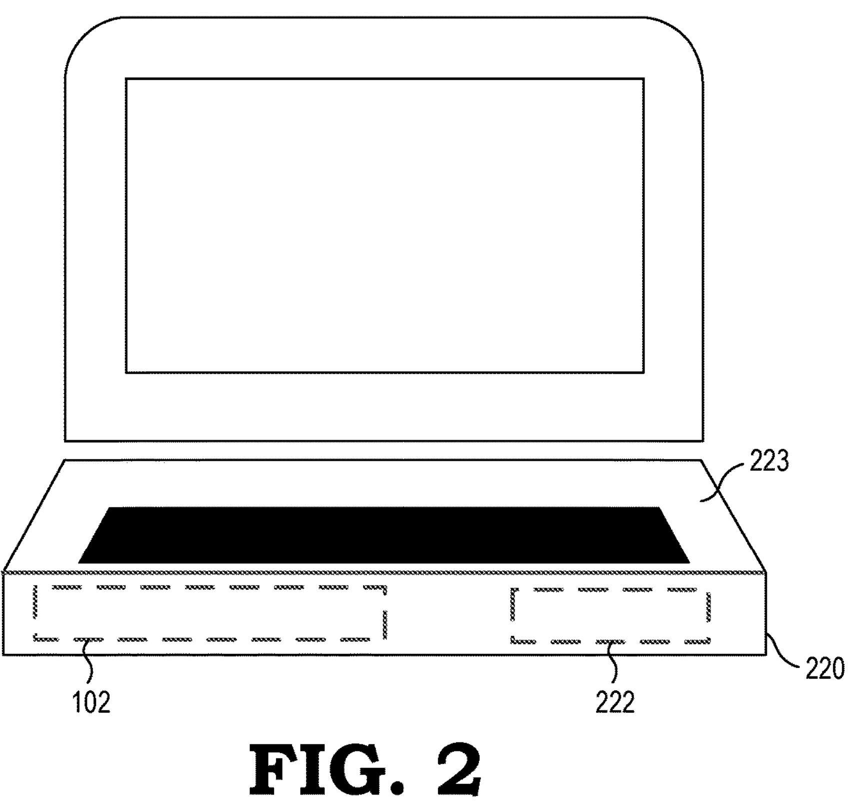
FIG. 2 is a diagram of a computer chassis that impacts temperature readings from the temperature sensors of FIG. 1 in accordance with some embodiments.

In some embodiments, the sensor correlations for the APU 110 and the dGPU 116 are further adjusted based on characteristics of a computer chassis in which the PCB 102 is intended to be placed. To illustrate, in many cases the processing system 100 is to be implemented in a computer chassis, such as a laptop chassis. An example computer chassis 220 is illustrated at FIG. 2 in accordance with some embodiments. In the depicted example, the computer chassis 220 includes a housing 223 that contains a plurality of components. Thus, in the example arrangement of FIG. 2, the PCB 102 is placed in a slot near other computer components (e.g., component 222), such as disk drives, network interface cards, a battery or other power supply components, mechanical components to secure the PCB 102 to the housing 223, and the like. In some cases, the housing 223 and other components of the computer chassis 220 have an impact on the thermal behavior of the processing system 100, and in particular affect the correlation between the temperature measurements at the temperature sensors 106-108 and the skin temperatures of the APU 110 and the dGPU 116. Accordingly, to improve the accuracy of skin temperature measurements by the temperature control module 115, the sensor correlations 118 are based on characteristics of the chassis 220.

To illustrate via an example, in some embodiments a given sensor correlation m has a nominal value, designated $m_{test}$, based on operating the PCB in a testbed environment. However, the testbed typically provides a very different environment than the computer chassis 220 and does not accurately mimic the thermal impact imposed by the computer chassis 220. Accordingly, as described further herein the $m_{test}$ value is adjusted based on the expected impact of the computer chassis 220, thereby improving the accuracy of skin temperature values generated by the temperature control module 115 and in turn improving the effectiveness of the temperature control subsystem.

Figure 3:
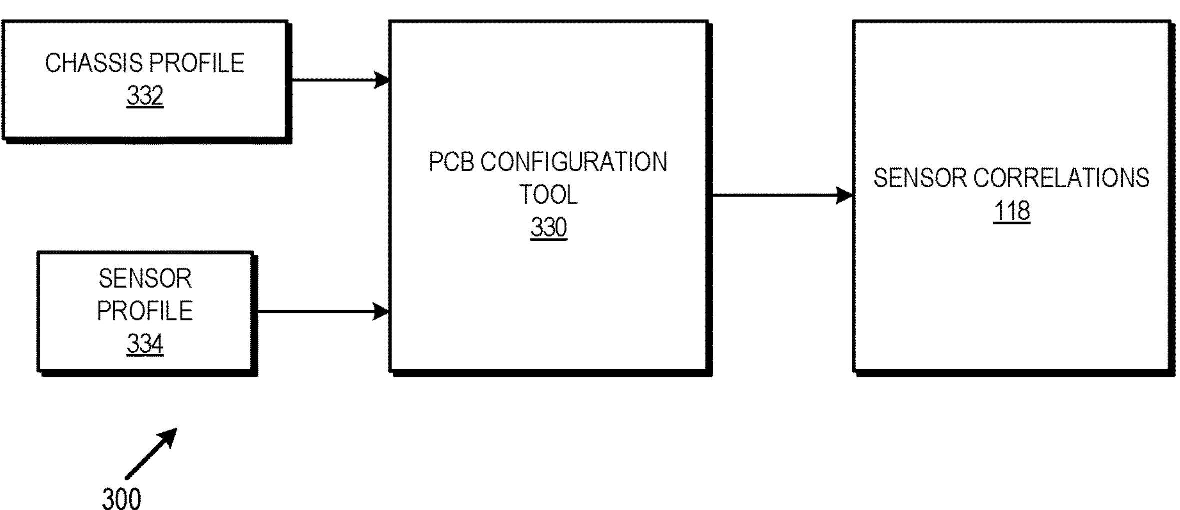
FIG. 3 is a block diagram of a system for generating correlation values for the processing system of FIG. 1 based on a chassis profile that predicts the thermal impact of a computer chassis in accordance with some embodiments.

FIG. 3 illustrates a block diagram of a system 300 for generating correlation values for the processing system 100 based on a chassis profile that predicts the thermal impact of the computer chassis 220 in accordance with some embodiments. In some embodiments, the system 300 is a computer system, such as a server or workstation, used during characterization of the PCB 102. The system 300 executes a PCB configuration tool 330 that generates the sensor correlations 118 as described further below. In some embodiments, the PCB configuration tool 330 is a software tool that provides a graphical user interface (GUI) or other interface that allows a user to adjust individual sensor correlation values, to test the PCB 102 with different sensor correlation values to determine the efficacy of different values for temperature control, to adjust other testing parameters such as the temperature threshold 119, and the like.

To generate the values for the sensor correlations 118, the PCB configuration tool 330 employs a chassis profile 332 and a sensor profile 334. In some embodiments, the sensor profile 334 is a data file that stores sensor correlation values based on testing of the PCB 102 in a testing environment. For example, in some embodiments the sensor profile 334 stores temperature measurement information as follows:

| Measurement | Sensor 106 Temp | Sensor 107 Temp | Sensor 108 Temp | APU Skin Temp |
|---|---|---|---|---|
| 1 | $T_1$ | $T_2$ | $T_3$ | $T_7$ |
| 2 | $T_4$ | $T_5$ | $T_6$ | $T_8$ |

where each measurement in the above table represents a different set of temperature measurements, under a different workload executing at the PCB 102.

In some embodiments, the PCB configuration tool 330 generates an initial sensor correlation value for each sensor based on an average, or other statistical combination, of the correlations between the APU skin temperature measurement and the corresponding temperature measurement of the corresponding sensor. For example, the PCB configuration tool 330 generates an initial sensor correlation value for the temperature sensor 106 based on an average of the correlation between the temperatures $T_7$ and $T_1$ and the correlation between the temperatures $T_8$ and $T_4$.

The PCB configuration tool 330 then adjusts the initial sensor correlation values based on the chassis profile 332. In some embodiments, the chassis profile 332 is a data file generated by testing the thermal characteristics of the chassis 220 or another computer chassis. In other embodiments, the chassis profile is based on computer modeling of the chassis 220. In still other embodiments, the chassis profile is based on testing or simulation of aspects of the chassis 220, such as one or more of the shape of the housing 223, the components expected to be used with the computer chassis 220 (e.g., the number of PCBs to be placed in slots of the chassis 220), and the like. Thus, the chassis profile 332 represents a predicted effect of the computer chassis 220 on the sensor correlation values for the PCB 102. In some embodiments, the chassis profile 332 stores these predicted effects as adjustment factors for each of the temperature sensors 106-108. An example is illustrated in the following table:

| Sensor 106 | Sensor 107 | Sensor 108 |
|---|---|---|
| $A_1$ | $A_2$ | $A_3$ |

where $A_1$, $A_2$, and $A_3$ are the adjustment factors for the initial correlation values corresponding to the temperature sensors 106, 107, and 108, respectively. To determine the sensor correlation value for a given temperature sensor, the PCB configuration tool 330 multiplies the initial correlation value for the sensor by the corresponding adjustment factor. Thus, if $m_{106-1}$ is the initial sensor correlation value for the temperature sensor 106, the PCB configuration tool 330 generates the final correlation value based on the product $A_1 * m_{106-1}$. The PCB configuration tool 330 stores the final correlation value at the sensor correlations 118 for use during operation of the PCB 102.

It will be appreciated that in some cases the thermal effects of the computer chassis 220 vary for different locations of the PCB 102. Thus, the computer chassis 220 has different effects on the correlation between the skin temperature of the APU 110 and the temperature at different ones of the temperature sensors 106-108. Accordingly, in some embodiments the adjustment factors set represented by the chassis profile 332 are different. For example, in some embodiments, the adjustment factor $A_1$ is different than the adjustment factor $A_2$.

In some embodiments, the sensor correlation values for the dGPU 116 are generated in a similar fashion to that set forth above with respect to the APU 110, using a temperature sensor mounted on a surface, or skin, of the dGPU 116.

By employing the chassis profile 332 to generate the sensor correlations 118, the PCB configuration tool 330 improves the accuracy of temperature measurements, and temperature management, during operation of the PCB 102. Further, in some embodiments the chassis profile 332 is generated based on computer modeling of the computer chassis 220 or based on thermal testing of a test PCB having a different configuration than the PCB 102. The chassis profile 332 can thereby be generated relatively inexpensively, without the need to place the PCB 102 in the computer chassis 220 for testing, thereby promoting an efficient characterization process.

Figure 4:
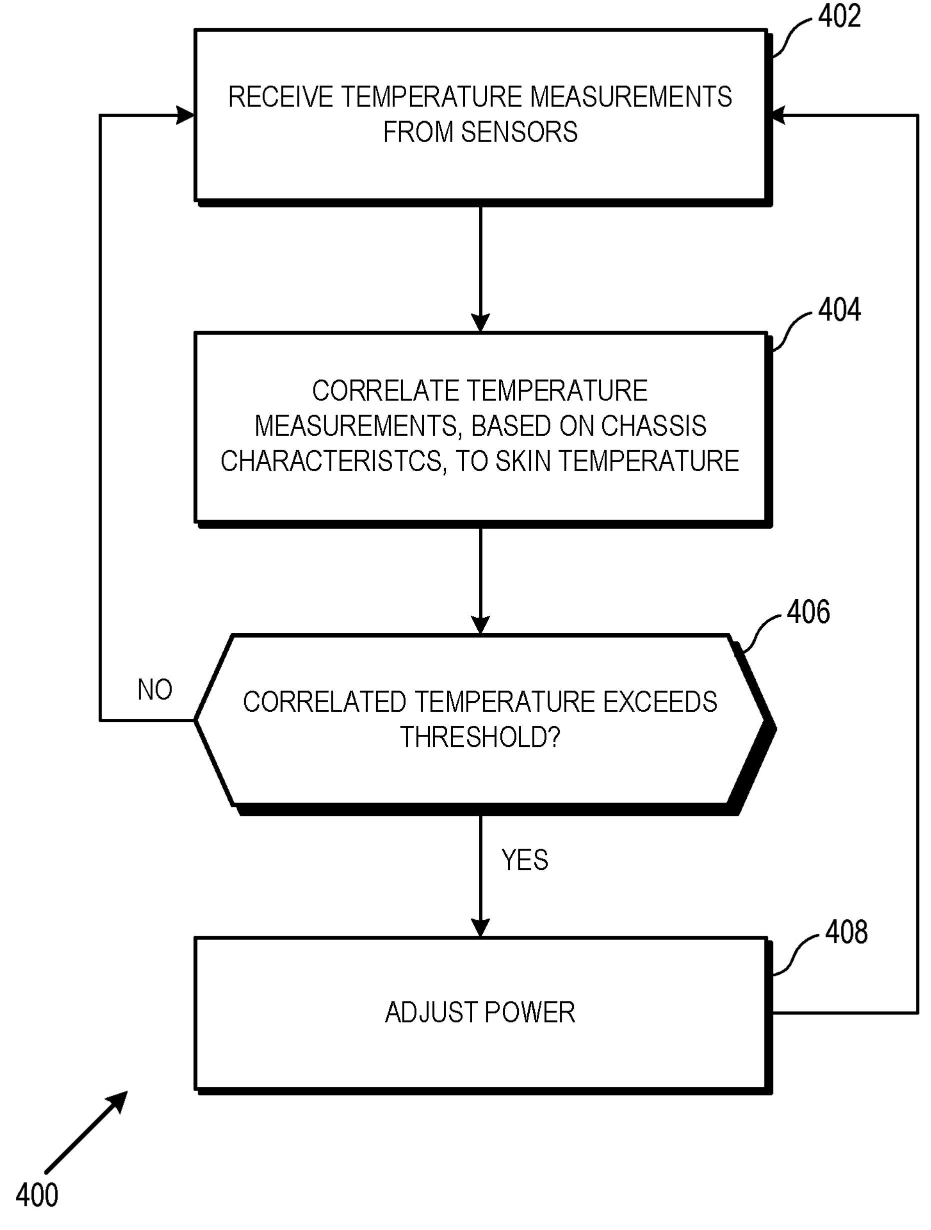
FIG. 4 is a flow diagram of a method of employing multiple temperature sensors of a processing system to manage the temperature of an APU in accordance with some embodiments.

FIG. 4 is a flow diagram of a method 400 of determining a skin temperature of a processing unit based on computer chassis information in accordance with some embodiments. The method 400 is described with respect to an example implementation at the APU 110 of FIG. 1. At block 402, the temperature control module 115 of the APU 110 receives, from the EC 105, digital temperature values for each of the temperature sensors 106-108. At block 404, the temperature control module 115 correlates the digital temperature values to the skin temperature of the APU 110 using the sensor correlations 118 to generate a skin temperature value. As explained above, the sensor correlations 118 are based on the predicted thermal impact of the computer chassis 220.

At block 406, the temperature control module 115 determines whether the skin temperature value exceeds the temperature threshold 119. If not, the method flow returns to block 402 and the temperature control module 115 continues to monitor the skin temperature of the APU 110. In response to the skin temperature value exceeding the temperature threshold 119, the method flow moves to block 408 and the temperature control module 115 indicates a temperature control event to the EC 105. In response, the temperature control module reduces the power supplied to the APU 110 by the power supply 104, thereby maintaining the skin temperature of the APU 110 within specified limits. The method flow returns to block 402.

In some embodiments, a method includes receiving, at a first processing unit disposed in a computer chassis, a first temperature reading from a first temperature sensor external to the processing unit; adjusting the first temperature reading based on a first correlation value, the first correlation value based on a predicted temperature behavior of the computer chassis; and adjusting power supplied to the first processing unit based on the adjusted first temperature reading. In one aspect, the method includes receiving at the first processing unit a second temperature reading from a second temperature sensor external to the first processing unit; adjusting the second temperature reading based on a second correlation value, the second correlation value based on the predicted temperature behavior of the computer chassis; and adjusting the power setting includes adjusting the power supplied based on the adjusted second temperature reading. In another aspect, the second correlation value is different than the first correlation value.

In one aspect, the first correlation value is further based on an identified temperature correlation between a location of the first sensor and a location at a surface of the first processing unit. In another aspect, the location of the first sensor is a first location of a printed circuit board. In yet another aspect, the second correlation value is further based on an identified temperature correlation between a second location of a second sensor and the location at the surface of the processing unit, and wherein the second location is a second location of the printed circuit board different than the first location. In still another aspect, the method includes adjusting the first temperature reading based on a second correlation value to identify a skin temperature associated with a second processing unit, the second correlation value different than the first correlation value; and adjusting the power supplied to the first processing unit based on the identified skin temperature associated with the second processing unit.

In some embodiments, a method includes receiving, at a first processing unit, a plurality of temperature readings from a plurality of sensors external to the processing unit; identifying a skin temperature of the first processing unit by adjusting each of the plurality of temperature readings based on a first plurality of correlation values, the first plurality of correlation values based on a predicted temperature behavior of a computer chassis; and adjusting power supplied to the first processing unit based on the identified skin temperature of the first processing unit. In one aspect, the plurality of correlation includes a first correlation value and a second correlation value, the second correlation value is different than the first correlation value. In another aspect, each of the plurality of correlation values is further based on an identified temperature correlation between a location of a sensor and a corresponding location at a surface of the processing unit.

In one aspect, the plurality of sensors is at different locations of a printed circuit board. In another aspect, identifying the skin temperature includes filtering the skin temperature based on a previous skin temperature value. In yet another aspect, identifying a skin temperature of a second processing unit by adjusting each of the plurality of temperature readings based on a second plurality of correlation values different than the first plurality of correlation values; and adjusting the power supplied to the first processing unit based on the identified skin temperature of the second processing unit.

In some embodiments, a processing unit includes: a plurality of processor cores; a temperature control module to: receive a first temperature reading from a first temperature sensor external to the processing unit; adjust the first temperature reading based on a first correlation value, the first correlation value based on a predicted temperature behavior of a computer chassis; and initiate adjustment of power supplied to the processing unit based on the adjusted first temperature reading. In one aspect the temperature control module is to: receive a second temperature reading from a second temperature sensor external to the processing unit; adjust the second temperature reading based on a second correlation value, the second correlation value based on the predicted temperature behavior of the computer chassis; and request adjustment of power, including requesting adjustment of power based on the adjusted second temperature reading.

In one aspect, the second correlation value is different than the first correlation value. In another aspect, the first correlation value is further based on an identified temperature correlation between a location of the first sensor and location at a surface of the processing unit. In yet another aspect, the first location is a first location of a printed circuit board. In still another aspect, the second correlation value is further based on an identified temperature correlation between a second location of the first sensor and the location at the surface of the processing unit, and wherein the second location is a second location of the printed circuit board different than the first location. In yet another aspect, the predicted temperature behavior is a simulated behavior of the computer chassis.

In some embodiments, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:

receiving, at a first processing unit disposed in a computer chassis, a first temperature reading from a first temperature sensor external to the first processing unit;

adjusting the first temperature reading based on a first correlation value to generate an adjusted first temperature reading of a skin temperature of the first processing unit, the first correlation value based on a predicted temperature behavior of the computer chassis;

applying a filter value to the adjusted first temperature reading to generate a filtered skin temperature to filter out noise; and reducing power supplied to the first processing unit proportionally to an amount by which the filtered skin temperature exceeds a threshold.

2. The method of claim 1, further comprising:

receiving at the first processing unit a second temperature reading from a second temperature sensor external to the first processing unit; and adjusting the second temperature reading based on a second correlation value, the second correlation value based on the predicted temperature behavior of the computer chassis, wherein reducing the power supplied to the first processing unit further comprises reducing the power supplied based on the adjusted second temperature reading.

3. The method of claim 1, wherein the first correlation value is further based on a temperature correlation between a location of the first temperature sensor and a location at a surface of the first processing unit.

4. The method of claim 3, wherein the location of the first temperature sensor is a first location of a printed circuit board.

5. The method of claim 2, wherein the second correlation value is further based on a temperature correlation between a second location of the second temperature sensor and a location at a surface of the first processing unit, and wherein the second location is a second location of a printed circuit board different than a first location of the first temperature sensor on the printed circuit board.

6. The method of claim 1, further comprising:

adjusting the first temperature reading based on a second correlation value to estimate a skin temperature associated with a second processing unit, the second correlation value different than the first correlation value; and reducing the power supplied to the first processing unit further based on the estimated skin temperature associated with the second processing unit.

7. A method comprising:

receiving, at a first processing unit disposed in a computer chassis, a plurality of temperature readings from a plurality of sensors external to the first processing unit;

estimating a skin temperature of the first processing unit by adjusting each of the plurality of temperature readings based on a first plurality of correlation values to generate an adjusted first temperature reading of the skin temperature of the first processing unit, the first plurality of correlation values based on a predicted temperature behavior of the computer chassis; and applying a filter value to the adjusted first temperature reading to generate a filtered skin temperature to filter out noise; and reducing power supplied to the first processing unit proportionally to an amount by which the filtered skin temperature exceeds a threshold.

8. The method of claim 7, wherein the first plurality of correlation values includes a first correlation value and a second correlation value, the second correlation value is different than the first correlation value.

9. The method of claim 7, wherein each of the first plurality of correlation values is further based on a temperature correlation between a location of a sensor of the plurality of sensors and a corresponding location at a surface of the first processing unit.

10. The method of claim 9, wherein the plurality of sensors is at different locations of a printed circuit board.

11. The method of claim 7, wherein estimating the skin temperature comprises filtering the skin temperature based on a previous skin temperature value.

12. The method of claim 7, further comprising:

estimating a skin temperature of a second processing unit by adjusting each of the plurality of temperature readings based on a second plurality of correlation values different than the first plurality of correlation values; and reducing the power supplied to the first processing unit further based on the estimated skin temperature of the second processing unit.

13. A processing unit, comprising:

a plurality of processor cores;

a temperature control processor to:

receive a first temperature reading from a first temperature sensor external to the processing unit;

adjust the first temperature reading based on a first correlation value to generate a first adjusted temperature reading of a skin temperature of the processing unit, the first correlation value based on a predicted temperature behavior of a computer chassis;

apply a filter value to the adjusted first temperature reading to generate a filtered skin temperature to filter out noise; and initiate reduction of power supplied to the processing unit proportional to an amount by which the filtered skin temperature exceeds a threshold.

14. The processing unit of claim 13, wherein the temperature control processor is to:

receive a second temperature reading from a second temperature sensor external to the processing unit; and adjust the second temperature reading based on a second correlation value, the second correlation value based on the predicted temperature behavior of the computer chassis, wherein initiating reduction of power supplied to the processing unit further comprises reducing power based on the adjusted second temperature reading.

15. The processing unit of claim 14, wherein the second correlation value is different than the first correlation value.

16. The processing unit of claim 14, wherein the first correlation value is further based on a temperature correlation between a location of the first temperature sensor and location at a surface of the processing unit.

17. The processing unit of claim 16, wherein the first temperature sensor is located on a printed circuit board.

18. The processing unit of claim 17, wherein the second correlation value is further based on a temperature correlation between a location of a second temperature sensor and the location at the surface of the processing unit, and wherein the second temperature sensor is located on the printed circuit board at a different location than the first temperature sensor.

19. The processing unit of claim 13, wherein the predicted temperature behavior is a simulated behavior of the computer chassis.

* * * * *